June 20, 1933.  C. REHBEIN  1,915,102

METHOD FOR FORMING A DRIP MOLDING

Filed June 27, 1930   6 Sheets-Sheet 1

INVENTOR
BY Conrad Rehbein
Barnes and Kisselle
ATTORNEY

June 20, 1933.　　　　C. REHBEIN　　　　1,915,102
METHOD FOR FORMING A DRIP MOLDING
Filed June 27, 1930　　　6 Sheets-Sheet 5

INVENTOR
Conrad Rehbein
BY Barnes and Kisselle
ATTORNEY

Patented June 20, 1933

1,915,102

UNITED STATES PATENT OFFICE

CONRAD REHBEIN, OF DETROIT, MICHIGAN, ASSIGNOR TO GENERAL MOTORS CORPORATION, OF DETROIT, MICHIGAN, A CORPORATION OF DELAWARE

METHOD FOR FORMING A DRIP MOLDING

Application filed June 27, 1930. Serial No. 464,371.

This invention relates to a method for forming a drip molding.

At present in the fabrication of vehicle bodies it is customary to use sheet metal panels. Various means have been used to cover the joints between, and the edges of, these panels. Among these means is the well-known drip molding that is arranged to be nailed or otherwise suitably fastened to the body. This type of molding has not only been expensive to manufacture and assemble to the body but also causes the paint to crack along the joint between the molding and the panel.

It is the object of this invention to produce a method for forming a drip molding which will eliminate the use of the nailed-on type of drip molding in conjunction with the front and rear quarter panels of the vehicle body roof and to this end it is proposed to press the drip molding directly out of the roof panel.

Figure 4:
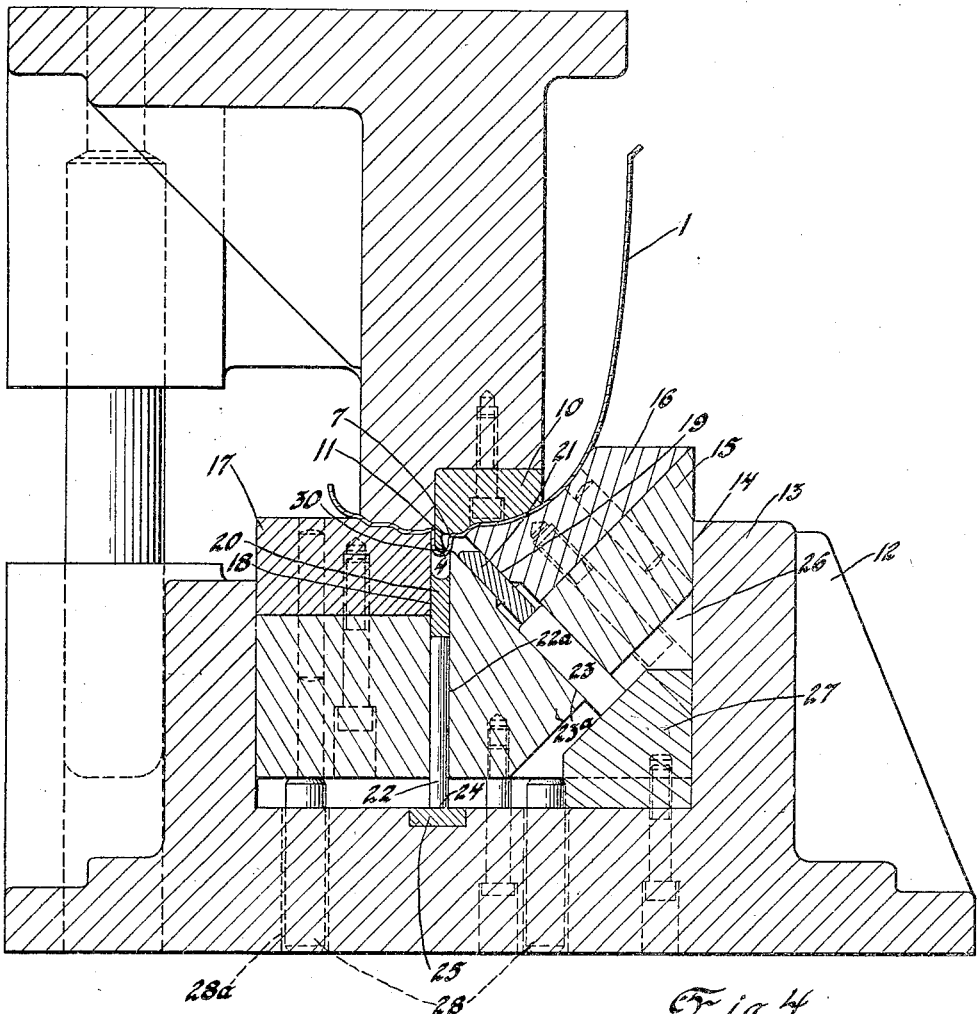
Fig. 4 is a section through the preferred set of dies and shows the position of the panel and the dies prior to the performing of the final step of the operation.
Figure 5:
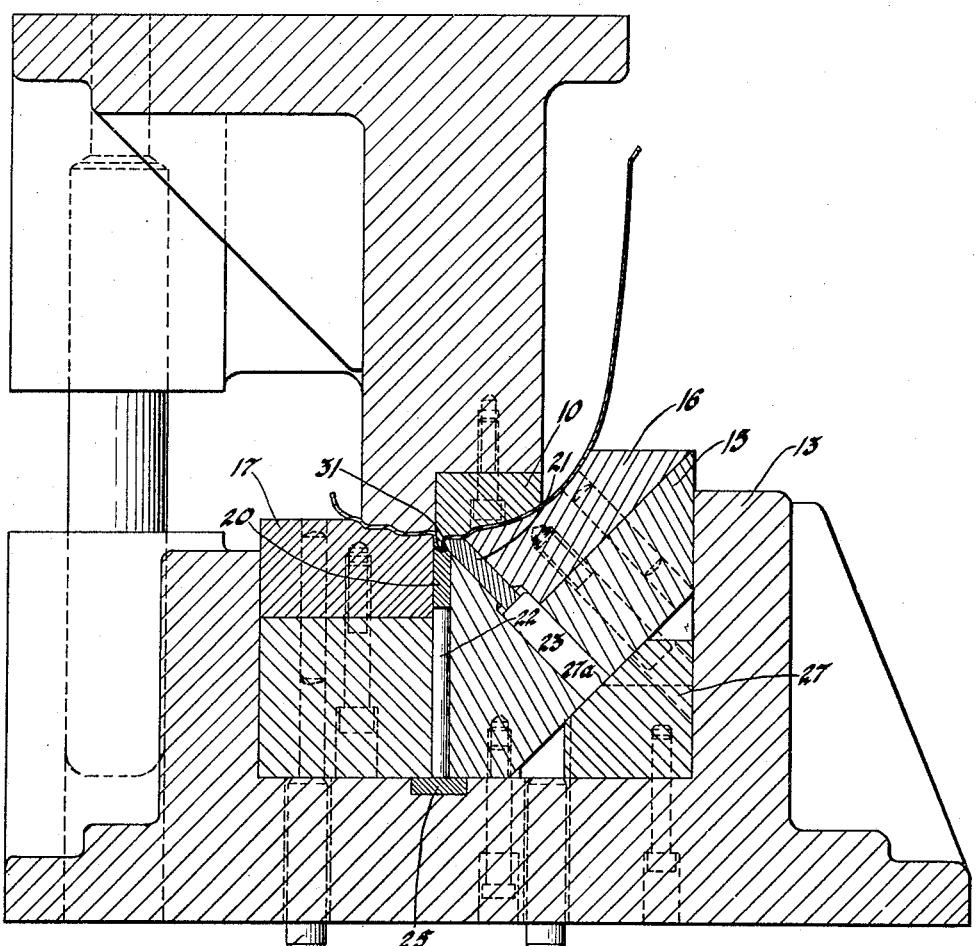
Fig. 5 is a section through the same set of dies and panel shown in Fig. 4 after the final step of the method has been formed.
Figure 6:
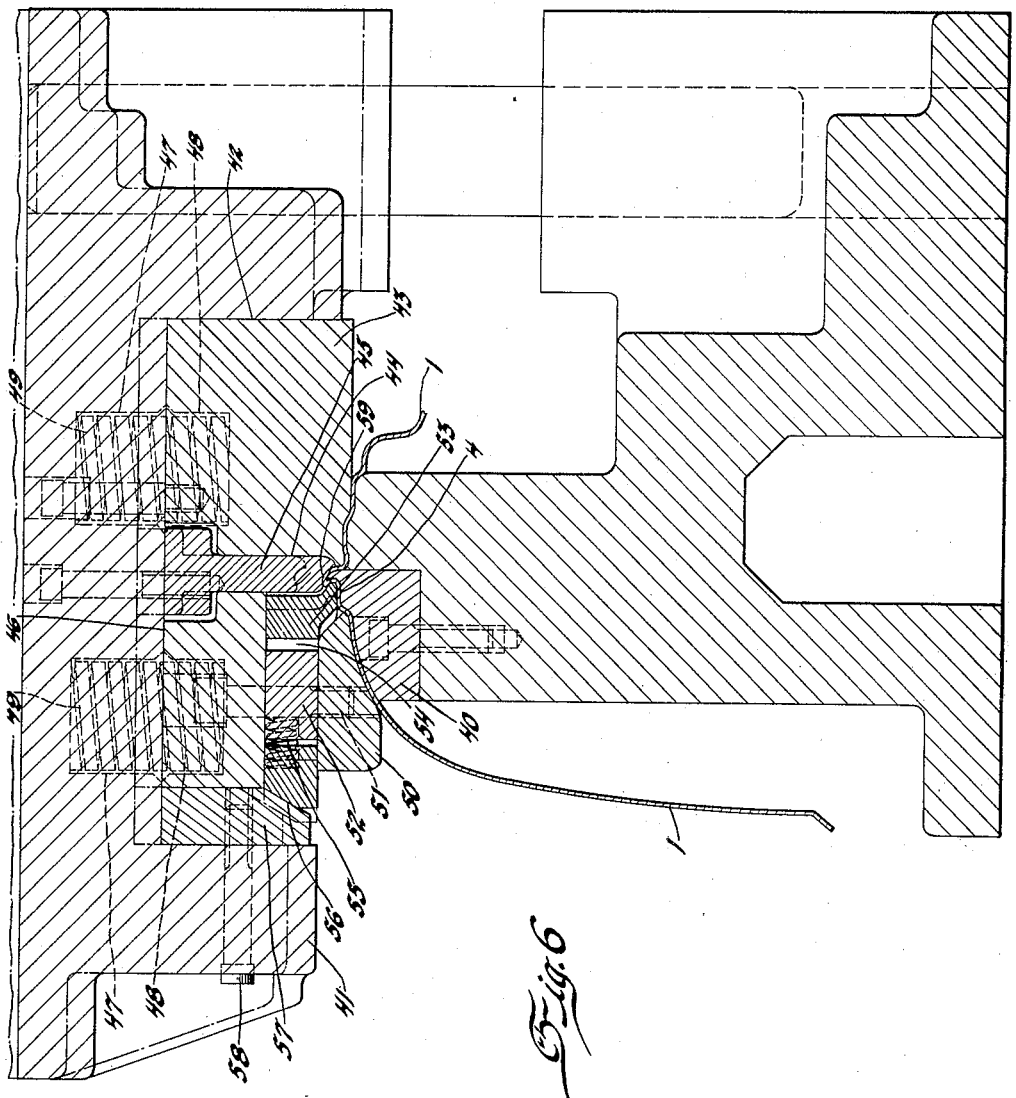
Figure 7:
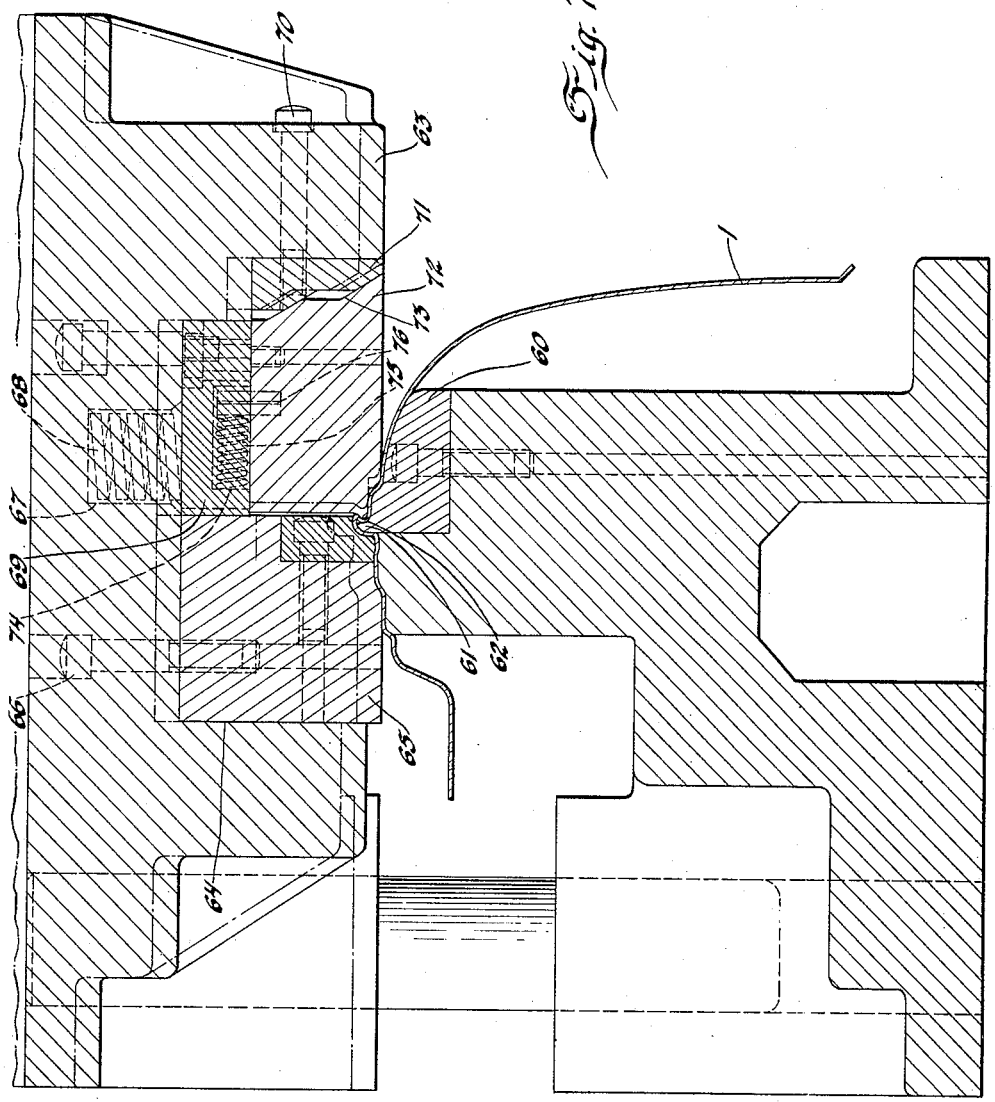
Figure 8:
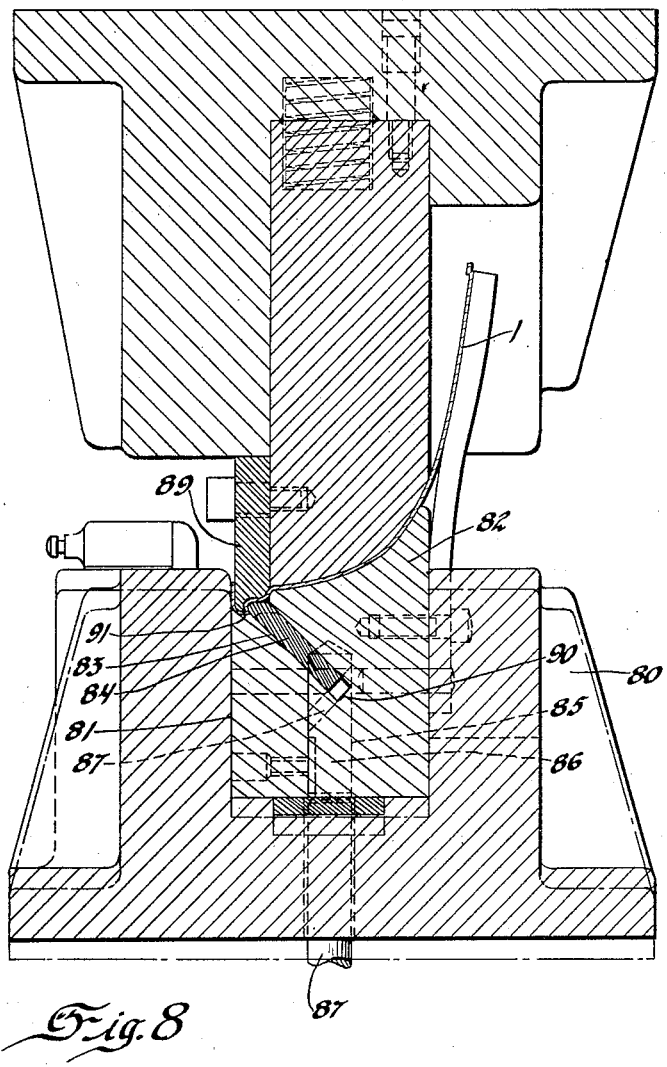

Figs. 6, 7, and 8 are sections showing modifications of the apparatus shown in Figs. 4 and 5.

Figure 1:
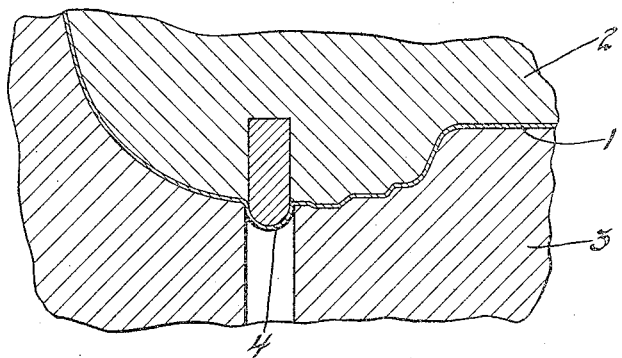
Figs. 1 and 2 are sections through the upper and lower dies with the panel in place and illustrating the first and second steps of the method.

Referring more particularly to the drawings, in Fig. 1 the first step in the method is shown in which the roof panel 1 is pressed between the upper and lower dies 2 and 3 respectively to press therein the longitudinal bead 4. It is understood throughout the description that the dies can be operated by any suitable means such as the well-known presses which are commonly used in stamping operations. After the roof panel 1 has had pressed therein the longitudinal bead 4 it is placed between the dies 5 and 6 which upon being brought together perform the second step in the method by pressing in the bead 4 lengthwise thereof to form the auxiliary bead 7.

Figure 2:
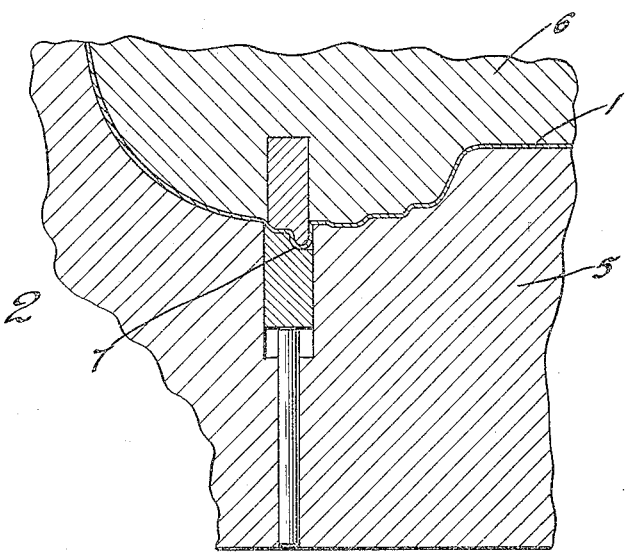
Figure 3:
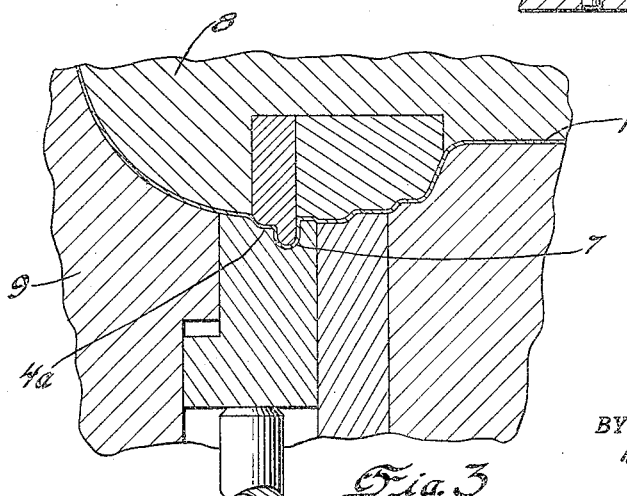
Fig. 3 is a section through an alternate set of dies with the panel therebetween in which the steps of Figs. 1 and 2 are combined into a single step.

As shown in Fig. 3 the steps illustrated in Fig. 2 can be performed simultaneously by the upper and lower dies 8 and 9 respectively. In this instance the dies 8 and 9 upon being brought together with the panel 1 therebetween draw out the longitudinal bead 4 at the same time that they press the auxiliary bead 7 out of the bead 4.

As described thus far the method includes pressing out the main bead 4 and the auxiliary bead 7, but this is not absolutely essential to the method. The main bead 4 is pressed and the auxiliary bead in turn pressed from the main bead 4 for the express purpose of giving the drip molding a contour that simulates the well-known and commonly used drip moldings. The method broadly would require merely the pressing out of the bead 7 from the panel 1 and in turn indenting this bead to form a drip trough, but the above outlined steps effect the drawing-out of a molding that simulates the commonly used drip molding in that the bead portion 4a (Fig. 3) simulates the coved portion of the presently used nail-on molding.

After the panel 1 has pressed therein the bead 4 and the bead 4 in turn has been pressed to form the longitudinal auxiliary bead 7, the panel is placed between the dies shown in Fig. 4. In this instance the upper die 10 is properly shaped so as to have the lengthwise groove therein as at 11. The lower die is a composite die and may be generally referenced 12. The upper and lower dies 10 and 12 may be held in the jaws of the press in any suitable manner. The base member 13 of the lower die has the opening 14 extending lengthwise thereof. The opening 14 is arranged to receive the various lower die members which are movable upwardly and downwardly in the opening 14. The die members 15, 16, and 17 are fixed together and function as a unit. The die member 15 has therein the diagonal longitudinal opening 18 and cooperates with die member 16 to form the opening 19 which openings house in slidable relation therewith the dies 20 and 21. The dies 20 and 21 are supported by a series of pins 22 and 23 which slidably engage the die 15 in the openings 22a and 23a respectively. The pins 22 engage the base member 13 as at 24, the base member 13 being provided with a suitable hardened pin seat 25.

The die member 15 has cut therein a plurality of recesses 26. The base member 13 in turn opposite the recesses 26 has fixed in the opening 14 the cam members 27 which serve as a seat for the pins 23.

As shown in Fig. 4 the die member 15 is supported by the pneumatically operated plungers 28 which slidably engage the base 13 in the openings 28a.

After the panel has pressed therein the bead 4 and auxiliary bead 7, it is next placed upon the dies 16 and 17. At this time plungers 28 yieldably support the lower die members 16 and 17, but the die members 20 and 21 have not as yet operated upon the panel 1.

The final step in the method is shown in Figs. 4 and 5. At this time the upper die moves downwardly to engage the panel 1 and force dies 16 and 17 downwardly. This in turn causes the cam 27 to slidably engage the pin 23 at 27a to force the die 21 upwardly and inwardly to indent the bead 4. At the same time the pin 22 through its engagement with the seat 25 holds the die 20 stationary to in turn press the metal in the auxiliary bead 4 upwardly as viewed in Fig. 5. It will be noted in Fig. 4 that the auxiliary bead 7 is somewhat spaced as at 30 from the upper die 10. Hence, as the die 20 moves upwardly it forces this free metal in the bead 7 upwardly to in turn provide sufficient metal for the die 21 which forces this spare metal inwardly or to the left, as viewed in Fig. 5, and downwardly in view of the position of the panel and drip trough when assembled to the vehicle body, to form the trough 31.

After the trough has been stamped into the panel 1 the upper die is released upwardly whereupon the pneumatic plungers 28 raise the dies 16 and 17 and hence, the pins 22 and 23 also recede in the openings 22a and 23a and thus permit the dies 20 and 21 to withdraw.

In Fig. 6 I have shown a modified form of the apparatus for pressing the drip trough into the panel 1. After the panel is shaped as shown in Figs. 2 and 3 it is inserted into the press between the lower die 40 and upper composite die 41. In Figs. 6, 7, and 8 the dotted lines show the relative position of the parts just prior to the pressing of the drip trough into the panel and the full lines show the relative position of the apparatus after the trough has been pressed into the panel.

In this form of the apparatus the base member 41 of the upper die has an opening 42 in which is slidably mounted the die member 43. The die member 43 has an opening 44 therein in which is slidably mounted the die member 45 which extends lengthwise of the die 43. The die member 45 engages the base member 41 as at 46. The base member 41 also has a series of holes 47 therein which cooperate with the similar openings 48 in the die member 43 to form a housing for the coil springs 49. The coil springs 49 yieldably support the die member 43 in the opening 42 when the base member 41 is in the position shown in the dotted lines (Fig. 6).

The die 50 is fixed to the die 43 by means of the bolts 51 and is spaced from the die member 43 by means of a series of spaced blocks 52. Slidably positioned between the die members 50 and 43 is the die member 53 which has a series of openings 54 therein for the blocks 52. The outer face of the opening 54 cooperates with the outer face of the block 52 to form a housing for the coil springs 55 which serves to move the die member 53 to the left as viewed in Fig. 6. The outer end of the die 53 is beveled as at 56 to in turn slidably engage the beveled face of the cam member 57 which is fixed to the base member 41 of the die by the bolt 58.

In this form of the apparatus the panel is placed upon the lower die 40, the base 41 being in the relative position shown by the dotted lines and at this time the coil springs 49 yieldably support the die members 43 and 50. As the upper and lower dies come together the coil springs 49 are compressed and in turn the die member 45 moves relatively in the opening 44 to the position shown by the full lines. At the same time the cam 57 engages the beveled face 56 of the die 53 and forces it to the right against the tension of the spring 55 to in turn press a trough in the panel 1 by forming a fold in the bead 4 as at 59.

After the drip molding has been pressed in the panel 1 the jaws of the press separate in turn causing the upper composite die to move away from the lower die 40. At this time the coil springs 49 are permitted to expand and consequently yieldably hold the dies 50 and 43 against the panel since they are free to slide in the opening 42 of the base member 41. At the same time the die 45 which is fixed to the bottom of the opening 42 recedes relatively below the working surface of the dies 43 and 53 and the movement of the cam 57 permits the coil spring 55 to expand and consequently draw the die 53 to the left as viewed in Fig. 6. After the coil springs 49 have reached the limit of their expansion, obviously the dies 43 and 50 separate from the lower die 40 as the jaws of the press separate and hence permit the removal of the panel 1 from the press. The jaws of the press have not been shown since any conventional press may be used and the functioning of such a press is well-known by those versed in the art.

In Fig. 7 is shown another modification of the drip molding forming apparatus. In this apparatus the lower die member 60 is the same as those shown in the apparatus shown in Figs. 4 to 6 and has the lengthwise male projection 61 which is grooved as at 62 to assist in the formation of the trough in the bead 4. In this apparatus the base member 63 of the upper composite die has an opening 64 in which is fixed the die member 65 by means of the bolt 66. The base member 63 also has an opening 67 therein which serves as a housing for the coil spring 68 which presses downward against the die member 69 which is slidably held in the opening 64 in slidable engagement with the die member 65. The base member 63 has fixed thereto by the bolt 70 the cam 71.

The die member 69 slidably supports the die member 72 which has the cam surface 73. The die member 69 has a series of openings 74 therein which serve as housings for the coil springs 75. In each case one end of a coil spring 75 abuts against the side of the opening 74 and the other end abuts against the abutment 76 which is fixed to the die member 72 and projects into the opening 74. Hence, the coil springs 75 yieldably press the die member 72 to the right as viewed in Fig. 7 and the coil springs 68 yieldably press the die members 69 and 72 downward as viewed in Fig. 7.

In operation the panel 1 is positioned between the lower die 60 and the upper die 72. At this time the base member 63 and the die 65 are in the relative position shown in the dotted lines, the die member 72 and panel 1 being yieldably supported by means of the coil springs 68. As the upper and lower dies move toward each other the cam 71 slidably engages the bevel surface 73 of the die 72 and forces it inwardly to in turn press the metal of the panel into the groove 62 to form a fold in the panel which serves as a drip trough. In a manner similar to that of the apparatus shown in Fig. 6 as the base 63 recedes from the upper die 60 the coil springs 75 force the die 72 outwardly or to the right as viewed in Fig. 7 to the position shown in the dotted lines.

In Fig. 8 is shown a further modification of the apparatus. In this form of the apparatus the base 80 of the lower composite die member has an opening 81 in which is slidably supported the die member 82. The die member 82 has a diagonal longitudinal opening 83 therein in which is slidably mounted the die 84. The die member 82 also has a series of openings 85 therein which slidably receive the cam members 86 which have the cam surfaces 87. The cams 86 rest upon the bottom of the opening 81 in the base member 80.

In operation when the base member 80 is in the relative position shown in the dotted lines, the plungers 87 yieldably support the die 82 and the panel 1. As the upper and lower dies move from the position shown in the dotted lines to the position shown in the full lines, the cams 86 engage the die 84 as at 90 to force the same obliquely upward into the position shown in the full lines to in turn fold the panel 8 as at 91 to form a drip trough therein.

From the above description it is evident that there is here produced a method for fabricating a drip molding such as described and claimed in my co-pending application, filed June 28, 1930, Serial No. 464,474 which essentially comprises pressing a portion of the panel outwardly to form a bead and then indenting the bead to form a pleat or fold which serves as a drip trough.

I claim:

1. The method of fabricating a drip molding for a vehicle body having a sheet metal roof panel comprising pressing a bead in the said panel and then indenting the said bead longitudinally thereof to form a trough.

2. The method of fabricating a drip molding for a vehicle body having a sheet metal roof panel comprising pressing a portion of the panel outwardly and then pressing the pressed out portion of the panel inwardly and downwardly to form a trough.

3. The method of fabricating a drip molding for a vehicle body having a sheet metal roof panel comprising drawing a bead lengthwise of the said panel and then folding a portion of the said bead upon itself to form a drip trough.

4. The method of fabricating a drip molding for a vehicle body having a sheet metal roof panel comprising pressing outwardly a portion of the said panel to form a bead lengthwise thereof, then pressing a portion of the bead inwardly to provide metal to permit the pressing lengthwise of the said bead downwardly without drawing the metal in the said bead, and then pressing the bead downwardly to form a drip trough.

5. The method of fabricating a drip molding for a vehicle body having a sheet metal roof panel comprising, pressing a bead lengthwise in the said panel to simulate a coved molding, pressing a second bead in the first mentioned bead and then indenting the second bead to form a drip trough.

In testimony whereof I affix my signature.

CONRAD REHBEIN.